US008619626B2

(12) United States Patent
Schneyer et al.

(10) Patent No.: US 8,619,626 B2
(45) Date of Patent: Dec. 31, 2013

(54) METHOD AND APPARATUS FOR INSTANCE IDENTIFIER BASED ON A UNIQUE DEVICE IDENTIFIER

(75) Inventors: Sean Kendall Schneyer, The Colony, TX (US); Fredrik Lindholm, Alvsjo (SE); Alf Heidermark, Saltsjobaden (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 430 days.

(21) Appl. No.: 12/426,429

(22) Filed: Apr. 20, 2009

(65) Prior Publication Data

US 2010/0008254 A1 Jan. 14, 2010

Related U.S. Application Data

(62) Division of application No. 12/211,607, filed on Sep. 16, 2008.

(60) Provisional application No. 61/079,293, filed on Jul. 9, 2008, provisional application No. 61/103,134, filed on Oct. 6, 2008.

(51) Int. Cl.
*H04L 12/28* (2006.01)

(52) U.S. Cl.
USPC ............ 370/254; 370/338; 370/342; 455/411

(58) Field of Classification Search
USPC .................. 370/254, 352; 455/411, 435.1
See application file for complete search history.

(56) References Cited

U.S. PATENT DOCUMENTS

| 6,928,066 | B1* | 8/2005 | Moon et al. .................. 370/342 |
| 6,996,087 | B2* | 2/2006 | Ejzak ............................ 370/338 |
| 7,145,997 | B2* | 12/2006 | Poikselka et al. ......... 379/210.01 |
| 7,624,266 | B2* | 11/2009 | Gabor .......................... 713/168 |
| 7,701,974 | B2* | 4/2010 | Mayer et al. ................. 370/474 |
| 7,715,324 | B1* | 5/2010 | Harvell et al. ............... 370/252 |
| 7,738,894 | B2* | 6/2010 | Sung et al. ................... 455/518 |
| 7,746,836 | B2* | 6/2010 | Jentz et al. ................... 370/338 |
| 7,760,712 | B2  | 7/2010 | Buckley |
| 7,796,589 | B2* | 9/2010 | Cohen et al. ................. 370/389 |
| 7,870,196 | B2* | 1/2011 | Costa Requena ............ 709/206 |
| 8,060,612 | B1* | 11/2011 | Mangal et al. ............... 709/226 |
| 8,135,386 | B2* | 3/2012 | Schneyer et al. ............ 455/411 |
| 2007/0141986 | A1 | 6/2007 | Kuehnel et al. |
| 2007/0238466 | A1 | 10/2007 | Buckley et al. |
| 2008/0089308 | A1 | 4/2008 | Jentz et al. |
| 2008/0194223 | A1* | 8/2008 | Overby ..................... 455/404.1 |

FOREIGN PATENT DOCUMENTS

JP 2007-215175 A 8/2007

OTHER PUBLICATIONS

Rosenberg, "Obtaining and Using Globally Routable User Agent (UA) URIs (GRUU) in the Session Initiation Protocol (SIP)", Apr. 9, 2007, The IETF Trust (2007).*

(Continued)

*Primary Examiner* — Dang Ton
*Assistant Examiner* — Brian O Connor

(57) ABSTRACT

A method and apparatus for use in a communications network whereby an Instance Identifier (ID) is created to uniquely identify a device such as a mobile device or User Equipment (UE) in the communications network.

5 Claims, 13 Drawing Sheets

(56) References Cited

OTHER PUBLICATIONS

Jennings Cisco Systems C et al: "Instance Identifiers for SIP User Agents; draft-jennings-sipping-inst ance-id-01.txt" IETF Standard-Working-Draft, Internet Engineering Task Force, IETF, CH, No. 1, Jul. 13, 2005, XP015040577 ISSN: 0000-0004 chapters 2, 3, 4.

Henry, M Intel Corp: "DHCP Options for Host System Characteristics; draft-dittert-host-sys-char-03.txt" IETF Standard-Working-Draft, Internet Engineering Task Force, IETF, CH, No. 3, Feb. 22, 1999, XP015012481 ISSN: 0000-0004 chapter 3.0.

Leach Microsoft Mmealling Refactored Networks P et al: "A Universally Unique Identifier (UUID) URN Namespace; rfc4122.txt" IETF Standard, Internet Engineering Task Force, IETF, CH, Jul. 1, 2005, XP015041880 ISSN: 0000-0003.

"Universal Unique Identifier". http://pubs.opengroup.org/onlinepubs/9629399/apdxa.htm#tagcjh/_20, Dec. 1997.

Ericsson: "HSS to Terminate User Authentication in IMS". Supplementary information for joint S2/S3 meeting to S2-011323. 3GPP TSG-SA WG2#18. Tdoc S2-011418. Mar. 2001.

"Obtaining and Using Globally Routable User Agent (US) URIs(GRUU) in the Session Initiation Protocol (SIP)"; draft-ietf-sip-gruu-15 (Oct. 2007).

"Managing Client Initiated Connections in the Session Initiation Protocol (SIP)"; draft-ietf-sip-outbound-15 (Jun. 2008).

"A Universally Unique Identifier (UUID) URN Namespace"; IETF RFC 4122 (Jul. 2005).

"The Network Access Identifier"; IETF RFC 4282 (Dec. 2005).

"International Mobile Station Equipment Identities (IMEI)"; 3GPP TS 22.016, May 2007.

"Numbering, addressing and identification"; 3GPP TS 23.003, Jun. 2008.

"3G Mobile Equipment Identifier (MEID), Stage 1"; 3GPP2 S.R0048-A, Jun. 2005.

"IP Multimedia (IM) Core Network (CN) subsystem Centralized Services (ICS); Stage 3"; 3GPP TS 24.292, Jul. 2008.

* cited by examiner

```
    The formal definition of the UUID string
representation is provided by the following ABNF:

UUID                    = time-low "-" time-mid
"-"
                                  time-high-and-version
"-"
                                  clock-seq-and-reserved
                                  clock-seq-low "-" node
        time-low                = 4hexOctet
        time-mid                = 2hexOctet
        time-high-and-version   = 2hexOctet
        clock-seq-and-reserved  = hexOctet
        clock-seq-low           = hexOctet
        node                    = 6hexOctet
        hexOctet                = hexDigit hexDigit
        hexDigit =
            "0" / "1" / "2" / "3" / "4" / "5" / "6" /
"7" / "8" / "9" /
            "a" / "b" / "c" / "d" / "e" / "f" /
            "A" / "B" / "C" / "D" / "E" / "F"

The following is an example of the string
representation of a UUID as a URN:

urn:uuid:f81d4fae-7dec-11d0-a765-00a0c91e6bf6
```

```
/* Name string is an IMEI or other device ID*/
    uuid_t NameSpace_DeviceID = { /* efcf4930-4caf-11dd-ae16-
0800200c9a66 */
        0xefcf4930,
        0x4caf,
        0x11dd,
        0xae, 0x16, 0x08, 0x00, 0x20, 0x0c, 0x9a, 0x66
    };
```

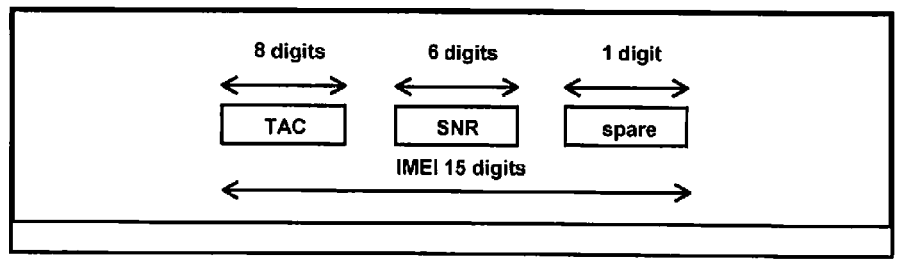
FIG. 3 \\
300
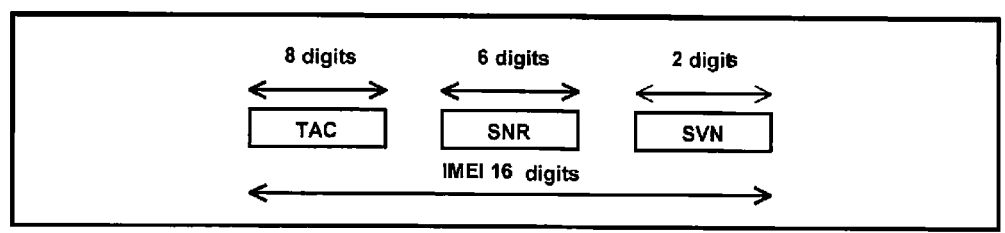
FIG. 4 \\
400
| TAC | | | | | | | Serial Number | | | | | | |
|---|---|---|---|---|---|---|---|---|---|---|---|---|---|
| N | N | T | T | T | T | F | F | Z | Z | Z | Z | Z | Z | CD |
FIG. 5 \\
500

600

```
REGISTER sip:user1_public1@home1.net SIP/2.0
Via: SIP/2.0/UDP
[5555::aaa:bbb:ccc:ddd];branch=z9hG4bKnashds7
Max-Forwards: 70
From: <sip:user1_public1@home1.net>;tag=4fa3
To: <sip:user1_public1@home1.net>
Contact:
<sip:[5555::aaa:bbb:ccc:ddd]>;expires=600000;+sip.instanc
e="<urn:uuid:721c5fce-7fd8-63cc-1a99-
9df549a58778>";+g.3gpp.icsi_ref="urn%3Aurn-xxx%3gpp-
service.ims.icsi.mmtel"
Call-ID: apb03a0s09dkjdfglkj49111
CSeq: 1 REGISTER
Supported: path, gruu
Content-Length: 0
```

```
REGISTER sip: ics.mnc015.mcc234.3gppnetwork.org SIP/2.0
Via: SIP/2.0/UDP
[5555::aaa:bbb:ccc:ddd];branch=z9hG4bKnashds7
Max-Forwards: 70
From:
<sip:234150999999999@ics.mnc015.mcc234.3gppnetwork.org>;ta
g=4fa3
To:
<sip:234150999999999@ics.mnc015.mcc234.3gppnetwork.org>
Contact:
<sip:[5555::aaa:bbb:ccc:ddd]>;expires=600000;+sip.instance
="<urn:uuid:721c5fce-7fd8-63cc-1a99-
9df549a58778>";+g.3gpp.icsi_ref="urn%3Aurn-xxx%3gpp-
service.ims.icsi.mmtel"
Call-ID: apb03a0s09dkjdfglkj49111
CSeq: 1 REGISTER
Supported: path, gruu
Content-Length: 0
```

FIG. 9 \
900

```
REGISTER sip:user1 public1@home1.net SIP/2.0
Via: SIP/2.0/UDP
[5555::aaa:bbb:ccc:ddd];branch=z9hG4bKnashds7
Max-Forwards: 70
From: <sip:user1 public1@home1.net>;tag=4fa3
To: <sip:user1 public1@home1.net>
Contact:
<sip:[5555::aaa:bbb:ccc:ddd]>;expires=600000;+sip.instance
="<urn:gsma:imei:35196500-718917-
0>"+g.3gpp.icsi_ref="urn%3Aurn-xxx%3gpp-
service.ims.icsi.mmtel"
Call-ID: apb03a0s09dkjdfglkj49111
CSeq: 1 REGISTER
Supported: path, gruu
Content-Length: 0
```

FIG. 11    \
            1100

```
SIP/2.0 200 OK
Via: SIP/2.0/UDP icscf1.home1.net;branch=z9hG4bK351g45.1,
SIP/2.0/UDP
[5555::aaa:bbb:ccc:ddd]:1357;branch=z9hG4bKnashds7
Path: <sip:term@msc.visited1.net;lr>
Service-Route:<sip:orig@scscf1.home1.net;lr>
From:
To:
Call-ID:
Contact: <sip:[5555::aaa:bbb:ccc:ddd]>;pub-gruu="user1
public@home1.net; gr=urn:uuid:721c5fce-7fd8-63cc-1a99-
9df549a58778";temp-gruu="sip:tgruu.7hs==jd7vnzga5w7fajsc7-
ajd6fabz0f8g5@example.com;gr";+sip.instance="<urn:uuid:f81
d4fae-7dec-11d0-a765-00a0c91e6bf6>";expires=600000
CSeq:
P-Associated-URI: <sip:+358-50-
4821437@home1.net;user=phone>, <tel:+358504821437>
Content-Length:
```

FIG. 12    \
           1200

```
REGISTER sip: ics.mnc015.mcc234.3gppnetwork.org SIP/2.0
Via: SIP/2.0/UDP
[5555::aaa:bbb:ccc:ddd];branch=z9hG4bKnashds7
Max-Forwards: 70
From:
<sip:234150999999999@ics.mnc015.mcc234.3gppnetwork.org>;ta
g=4fa3
To:
<sip:234150999999999@ics.mnc015.mcc234.3gppnetwork.org>
Contact:
<sip:[5555::aaa:bbb:ccc:ddd]>;expires=600000;+sip.instance
="<urn:gsma:imei:35196500-718917-
0>";+g.3gpp.icsi_ref="urn%3Aurn-xxx%3gpp-
service.ims.icsi.mmtel"
Call-ID: apb03a0s09dkjdfglkj49111
CSeq: 1 REGISTER
Supported: path, gruu
Content-Length: 0
```

FIG.14  \
1400

```
SIP/2.0 200 OK
Via: SIP/2.0/UDP icscf1.home1.net;branch=z9hG4bK351g45.1,
SIP/2.0/UDP
[5555::aaa:bbb:ccc:ddd]:1357;branch=z9hG4bKnashds7
Path: <sip:term@msc.visited1.net;lr>
Service-Route:<sip:orig@scscf1.home1.net;lr>
From:
To:
Call-ID:
Contact: <sip:[5555::aaa:bbb:ccc:ddd]>;pub-
gruu="234150999999999@ics.mnc015.mcc234.3gppnetwork.org;
gr=urn:uuid:721c5fce-7fd8-63cc-1a99-9df549a58778";temp-
gruu="sip:tgruu.7hs==jd7vnzga5w7fajsc7-
ajd6fabz0f8g5@example.com;gr";+sip.instance="<urn:uuid:f81
d4fae-7dec-11d0-a765-00a0c91e6bf6>";expires=600000
CSeq:
P-Associated-URI: <sip:+358-50-
4821437@home1.net;user=phone>, <tel:+358504821437>
Content-Length:
```

FIG. 15  \
1500

METHOD AND APPARATUS FOR INSTANCE IDENTIFIER BASED ON A UNIQUE DEVICE IDENTIFIER

CROSS-REFERENCE TO RELATED APPLICATIONS

This application is a divisional of U.S. patent application Ser. No. 12/211,607 filed Sep. 16, 2008 and claims the benefit of U.S. Provisional Application No. 61/079,293 filed Jul. 9, 2008 and U.S. Provisional Application No. 61/103,134 filed Oct. 6, 2008, the disclosures of which are incorporated herein by reference.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

The present invention relates to SIP based communication and data systems. The abbreviations used herein shall have the following meanings:
CS: Circuit Switched
CSCF: Call Session Control Function
DevID: Device Identifier
ESN: Electronic Serial Number
GRUU: Globally Routable User Agent (UA) URIs
HSS: Home Subscriber Server
I-CSCF: Interrogating CSCF
ICS: IMS Centralized Services
ID: Identifier
IMEI: International Mobile Equipment Identity
IMEISV: IMEI Software Version
IMS: IP Multimedia Subsystem
IP: Internet Protocol
MEID: Mobile Equipment Identifier
MSC: Mobile Switching Center
NAI: Network Access Identifier
NSS: Name Space Specific string
P-CSCF: Proxy CSCF
PS: Packet Switched
S-CSCF: Serving CSCF
SCC AS: Service Centralization and Continuity Application Server
SIP: Session Initiation Protocol
SNR: Serial Number
TAC: Type Allocation Code
UA: User Agent
UE: User Equipment
URI: Uniform Resource Identifiers
URN: Uniform Resource Name
UUID: Universally Unique Identifier In SIP-based systems, such as IMS, it would be advantageous to be able to target a request to a specific device, such as a mobile device, fixed line device, or an instance of a software based client. A software based client is not directly tied to a specific physical device and may execute on top of any suitable platform such as a personal computer or advanced mobile device. For example, when transferring a call, one may wish to target a specific device such as a user's mobile device.

In order to achieve this objective, a Globally Routable User Agent (UA) URN (GRUU) is assigned to the mobile device by the registrar (which is the S-CSCF in an IMS system). In order to properly assign the GRUU, the registrar uses an Instance ID that is provided by the mobile device during registration.

Current specifications assume that the device being targeted with the GRUU will always be the one that is performing the registration. However, with the introduction of IMS Centralized Services (ICS), it is possible that the network will register (in IMS) on behalf of the device when the device is using circuit-switched (CS) access. In the case of ICS, the MSC Server is the network entity that registers on behalf of the CS subscriber.

Since an ICS device may also be able to register directly (in IMS) when it is using packet-switched (PS) access, it is desirable that the Instance ID that is used by the network be identical to the Instance ID that is used by the device when performing registration. This will ensure that the same GRUU is assigned to the device.

The current IMS specifications (such as 24.229) do not provide any specific guidance on how either the device or the network are to create the Instance ID. The only guidance that is provided is that the Instance ID must match the format described in the IETF Outbound draft. Therefore, the current specifications do not ensure that the Instance ID used by the network will match the Instance ID used by the device.

Additionally, the current IMS specifications do not provide any guidance on how the registrar shall generate the GRUU from the Instance ID. This can lead to the generation of different GRUUs depending on which S-CSCF is assigned during registration, if different S-CSCF vendors choose to generate the GRUU in different ways.

A possible Instance ID would be to use an already existing equipment identity from the terminal, such as the IMEI, as the Instance ID. In the case that the S-CSCF were to simply use the Instance ID unchanged as the GRUU, as provided as an example in draft-ieff-sip-gruu-15, then this would expose the DevID to other users during session establishment. This could be considered a privacy violation and could be used to clone the equipment. Therefore, directly using an existing device identity such as the IMEI is not recommended from a privacy and security point of view.

It would be advantageous to have a method and apparatus for an instance ID based on a unique device identifier that overcomes the disadvantages of the prior art. The present invention provides such a method and apparatus.

BRIEF SUMMARY OF THE INVENTION

In one embodiment, the present invention is a method for creating Instance IDs that ensures that the Instance IDs are consistent whether they are created by the device or by the network. At the same time, the invention protects the user's privacy. To ensure consistency, the creation of the Instance ID is based on the principle of using a unique identifier that belongs to the device but is also known to the network (referred to herein as a DevID). To ensure privacy, the creation of the Instance ID or GRUU is based on the principles of using a hash to protect the DevID; and using a shared namespace that is used by both the network and the device when encoding the DevID into an Instance ID.

Optimally, the Instance ID would not contain information about the DevID passed in the clear. However, because it may not be possible to mandate that the UE protect the Instance ID as described in an embodiment of the present invention, it is necessary to also describe procedures for the registrar to provide some level of protection. As such, an alternative embodiment of the present invention describes an approach that can be used to provide some level of privacy even when the DevID is initially sent in the clear during registration.

Therefore, the embodiments of the present invention have at least two approaches for addressing the privacy concerns: (1) Defining a mechanism for creating an Instance ID which does not reveal any information about the actual DevID—This allows the Instance ID to be directly used as the GRUU; and (2) Defining a mechanism where, if the Instance ID contains the DevID in the clear, that the registrar manipulates the Instance ID in order to generate the GRUU. This provides privacy for DevID in non-registration signaling from the UE.

BRIEF DESCRIPTION OF THE SEVERAL VIEWS OF THE DRAWINGS

In the following section, the invention will be described with reference to exemplary embodiments illustrated in the figures, in which:

FIG. 1 is a table illustrating a UUID String Representation;

FIG. 2 is a table illustrating a Name space definition for IMEI or other device ID based UUID creation;

FIG. 3 illustrates the elements of an IMEI structure;

FIG. 4 illustrates the elements of an IMEISV structure;

FIG. 5 illustrates the elements of an MEID structure;

FIG. 7 is a message header showing an example REGISTER with Instance ID (sip.instance);

FIG. 9 is a message header illustrating the example REGISTER with an Instance ID (sip.instance);

FIG. 11 is a message header illustrating the example REGISTER with instance ID (sip.instance);

FIG. 12 is an example 200 (OK) with GRUU;

FIG. 14 is an example REGISTER with instance ID (sip.instance);

FIG. 15 is an example 200 (OK) with GRUU;

DETAILED DESCRIPTION OF THE INVENTION

Figure 6:
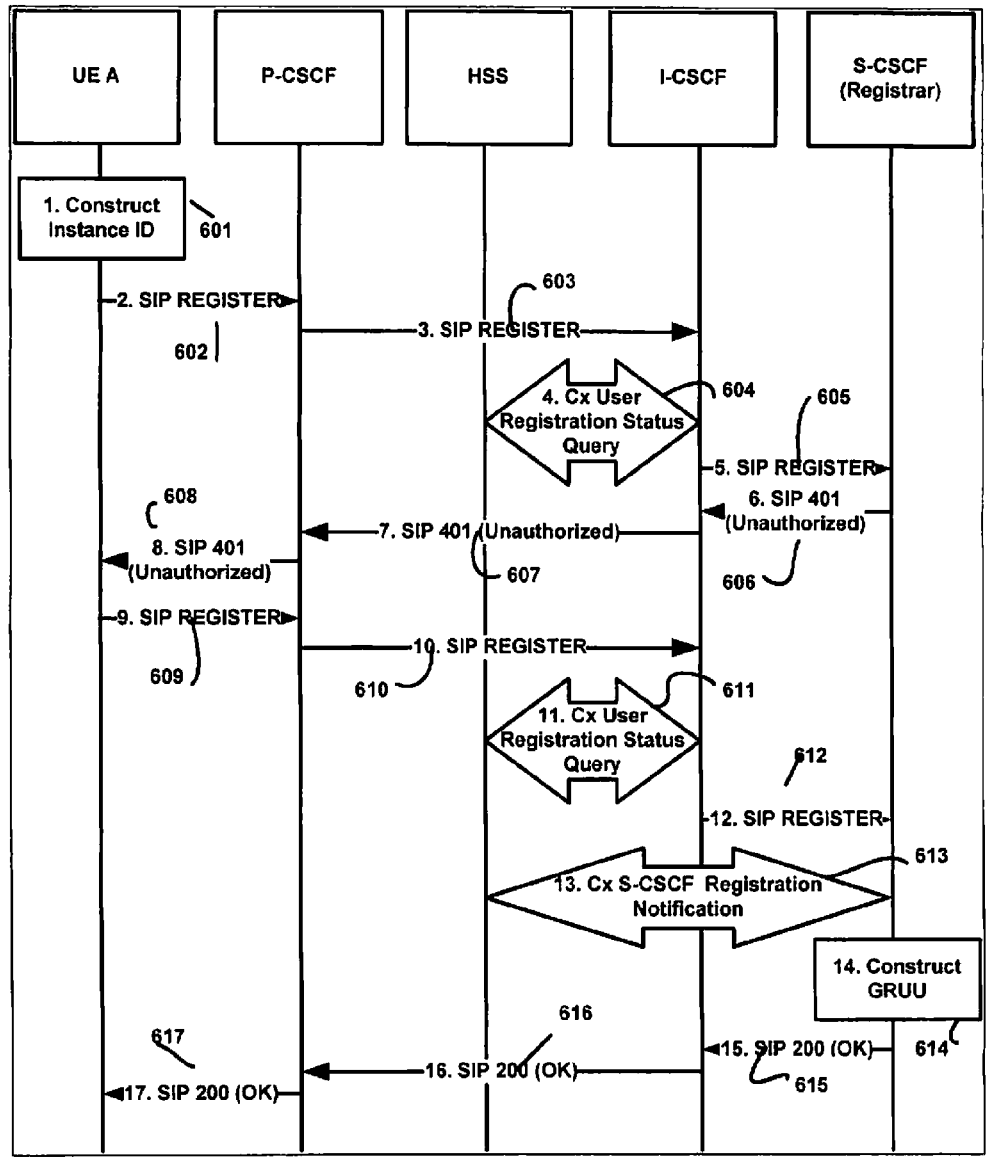
FIG. 6 is a messaging diagram illustrating device registration with protected DevID in Instance ID.

The embodiments described herein provide specific details for the creation of an Instance ID that ensures uniqueness of the ID, while ensuring the privacy of the existing equipment identities. Such embodiments also provide a mechanism to ensure that the network (e.g., an MSC Server) and the device create identical Instance IDs that are used in the creation of a GRUU. In one embodiment, the present invention makes use of the UUID format defined in RFC 4122. Additionally, the present invention provides a mechanism for the network to provide privacy for the DevID even when this ID is not protected in the Instance ID that is sent to the network during registration. This part of the invention uses the same techniques that are employed when the UE or MSC Server protects the DevID, however, these techniques are performed by the registrar (S-CSCF).

The device described with respect to an embodiment of the present invention is assumed to be a 3GPP mobile device that supports GRUU and the creation of an Instance ID. However the present invention is applicable to any device where the network and the device share knowledge of a device-specific identifier. In the case of a 3GPP compliant mobile device, the DevID may be derived from the IMEI. For a 3GPP2 compliant device, the DevID may be derived from the MEID or ESN.

For soft clients, and clients not fully conforming to the mobile standards, the IMEI (or equivalent) might not be available. Hence, in another embodiment of the invention, the DevID is created based on the private user identity of the device. In such a scenario, a device may be represented by several private user identities towards the registrar such as one from the UE over the PS access, and one from the MSC Server registering on behalf of the user. To ensure a consistent behavior, both the UE and the network performing the registration, select the DevID based on the private ID used by the network. An advantage of using the private ID from the network as the DevID is that it becomes agnostic to the type of CS access used.

Implementation Aspects Common to 3GPP and 3GPP2 Embodiments

In both 3GPP and 3GPP2 embodiments, the name-based version of the UUID is used as described in RFC 4122. Either version 3 or version 5 can be used; the only difference is the type of hashing that is used (MD5 and SHA-1, respectively).

As seen in Table 100 of FIG. 1, the Instance ID is constructed as a UUID URI using the string representation of a UUID as described in RFC 4122.

In order to create the final Instance ID, a name space ID is required. Table 200 of FIG. 2 provides the definition of a name space that is used as an example in this embodiment.

Unique Device Identifiers based on the Various Standardization Fora

In 3GPP, the IMEI is composed of the following elements (each element shall consist of decimal digits only):

Type Allocation Code (TAC). Its length is 8 digits;

Serial Number (SNR) is an individual serial number uniquely identifying each equipment within the TAC. Its length is 6 digits; and Spare digit (check digit): This digit is used as a Luhn checksum digit and is not transmitted with the IMEI.

The IMEI (14 digits) is complemented by a check digit. The check digit is not part of the digits transmitted.

An example DevID derivation is as follows:
3GPP IMEI:
TAC: 35196500
SNR: 718917
Check Digit: 7
DevID=TAC+SNR=35196500718917

The IMEISV is composed of the following elements (each element shall consist of decimal digits only):

Type Allocation Code (TAC). Its length is 8 digits;

Serial Number (SNR) is an individual serial number uniquely identifying each equipment within each TAC. Its length is 6 digits;

Software Version Number (SVN) identifies the software version number of the mobile equipment. Its length is 2 digits.

An example DevID derivation is as follows:
3GPP EMEISV:
TAC: 35196500
SNR: 718917
SVN: 04
DevID=TAC+SNR=35196500718917

In 3GPP2, for the MEID, all of these fields are defined as hexadecimal values with the following valid range.

NN—valid range A0—FF—globally administered
TTTTTT—valid range 000000-FFFFFF
ZZZZZZ—valid range 000000-FFFFFF
CD—valid range 0.F—The Check Digit (CD) is not part of the MEID and is not transmitted when the MEID is transmitted.

An example DevID derivation is as follows:
3GPP2 MEID:
TAC: A1000000
SNR: 3F0D50
CD:
DevID=TAC+SNR=A10000003F0D50

Additional Identifier alternative can be generated for devices without unique device IDs.

Non-3GPP and Non-3GPP2 Implementation

In an embodiment of a Private ID solution (access agnostic), there may not be a device specific ID, such as an IMEI, available to the client. This would be the case when using a soft client, for example. In this case, the private identity can be used instead.

The private identity takes the form of a Network Access Identifier (NAI) as defined in RFC 4282. An example private identity for IMS is: user1_private@home1.net.

An example DevID derivation is as follows:
Private ID:
Private ID: user1_private@home1.net
DevID=Private ID=user1_private@home1.net Instance ID Creation when Providing DevID Protection in the UE or Network (MSC Server)

The following describes the Instance ID creation when providing DevID protection in the UE or network (MSC Server). As previously described, the present invention is directed to protecting the DevID at the UE or MSC Server even during registration. Therefore, the DevID shall be encoded using the following steps in accordance with the method of the present invention:

Steps for creation of Instance ID at the UE or network (MSC Server) using a device specific ID, in this example using the IMEI as defined in 3GPP:

Choose a hash algorithm (MD5 or SHA-1). The following example uses MD5. (NOTE: The network and the device must use the same hash algorithm.)

Create a DevID by extracting the TAC and SNR from the IMEI (the IMEI structure is shown in FIG. 1). The TAC and SNR are used and the spare digit shall be omitted for a total of 14 digits used. By omitting the spare digit, this technique is also applicable to the IMEISV where the SVN shall be omitted as seen in FIG. 2.

In the case of non-3GPP devices where something other than IMEI is used, the only criteria for the DevID is that it is unique to the device and is also known by the network.

Place the name space ID (see name space ID defined in Table 2) and DevID in network byte order.

Concatenate the name space ID and DevID

Compute the hash of the concatenated string using the preselected hash algorithm.

Set the UUID fields as specified in RFC 4122 subclause 4.3 using the hash as computed above and create the string representation as show in clause 3 of the RFC.

Place the string representation in urn form by prepending "urn:uuid" to the above string. Example: urn:uuid:3647f493-4948-abe2-6599-7c295ab29804

This UUID URN is the Instance ID to be used for this device and by the network when registering on behalf of this device.

Example Call Flows Providing DevID Protection in the UE or Network (MSC Server)

Figure 8:
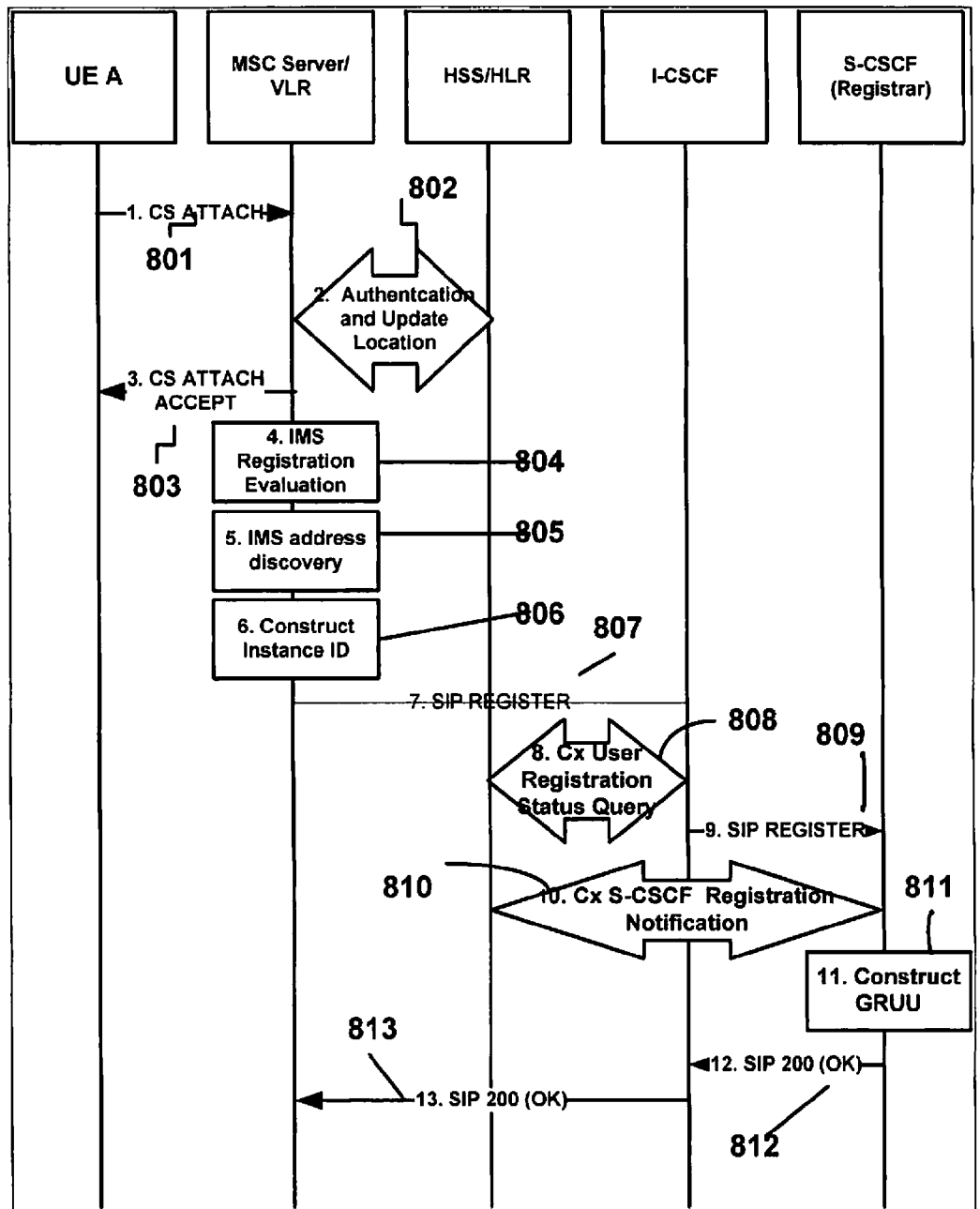
FIG. 8 is a messaging diagram illustrating the messages/commands occurring during network registration on behalf of a CS UE with protected DevID in Instance ID.

FIGS. 6 and 8 illustrate call flows using the method of the present invention. These example call flows show an IMS-based network architecture, however, the present invention also applies to non-IMS architectures as well.

FIG. 6 illustrates a call flow 600 when the mobile device registers itself directly in IMS (towards the registrar) using PS access with the protected DevID in the Instance ID. Referring now to FIG. 6, the basic registration flow in an exemplary embodiment of the present invention is shown. As seen therein, the steps of the signaling flow are as follows:

Step 601: 1. Construct Instance ID: UE A creates an Instance ID derived from its IMEI as described herein;

Step 602: 2. REGISTER request (UE A to P-CSCF): (using a message header 700 as seen in FIG. 7);

Step 603: 3. REGISTER request (P-CSCF to I-CSCF): The P-CSCF forwards the request to the I-CSCF;

Step 604: 4. Cx: User registration status query procedure: The I-CSCF makes a request for information related to the Subscriber registration status by sending the private user identity, public user identity and visited domain name to the HSS. The HSS returns the S-CSCF required capabilities and the I-CSCF uses this information to select a suitable S-CSCF;

Step 605: 5. REGISTER request (I-CSCF to S-CSCF): I-CSCF forwards the REGISTER request to the selected S-CSCF;

Step 606: 6. 401 (Unauthorized) (S-CSCF to I-CSCF): The S-CSCF challenges the registration request;

Step 607: 7. 401 (Unauthorized) (I-CSCF to P-CSCF): The I-CSCF forwards the response to the P-CSCF;

Step 608: 8. 401 (Unauthorized) (P-CSCF to UE A): The P-CSCF forwards the response to UE A;

Step 609: 9. REGISTER request (UE A to P-CSCF): UE A resends the REGISTER request (referred to in Step 602), this time with authentication credentials;

Step 610: 10. REGISTER request (P-CSCF to I-CSCF): The P-CSCF forwards the request to the I-CSCF;

Step 611: 11. Cx: User registration status query procedure: The I-CSCF makes a request for information related to the Subscriber registration status by sending the private user identity, public user identity and visited domain name to the HSS. The HSS returns the S-CSCF required capabilities and the I-CSCF uses this information to select a suitable S-CSCF;

Step 612: 12. REGISTER request (I-CSCF to S-CSCF): I-CSCF forwards the REGISTER request to the selected S-CSCF;

Step 613: 13. Cx: S-CSCF Registration Notification: The S-CSCF informs the HSS that the user has been registered. Upon being requested by the S-CSCF, the HSS will also include the user profile in the response sent to the S-CSCF;

Step 614: 14. Construct GRUU: The S-CSCF (acting as the registrar) constructs a GRUU based on the Instance ID that was created in Step 601. The GRUU is constructed as defined in draft-ietf-sip-gruu;

Step 615: 15. 200 (OK) (S-CSCF to I-CSCF): The S-CSCF sends a 200 (OK) response to the I-CSCF indicating that Registration was successful. The 200 (OK) response includes the GRUU that was created in the previous step;

Step 616: 16. 200 (OK) (I-CSCF to P-CSCF): The I-CSCF forwards the 200 (OK) response to the P-CSCF indicating that Registration was successful; and Step 617: 17. 200 (OK) (P-CSCF to UE A): The P-CSCF forwards the 200 (OK) response to UE A indicating that Registration was successful.

FIG. 8 illustrates a call flow 800 when the network registers on behalf of a device that is using CS access with protected DevID in Instance ID. The functionality of the present invention improves the flow described in 3GPP TS 24.292. The steps of such call flow are as follows:

Step 801: 1. CS attach (UE A to MSC);

Step 802: 2. Authentication and Update Location (MSCNLR to HLR/HSS);

Step 803: 3. CS attach accept (MSC to UE A);

Step 804: 4. IMS Registration evaluation: The MSC Server evaluates whether it needs to perform registration with IMS. This can be based on subscriber data received from the HSS/HLR;

Step 805: 5. IMS address discovery: The MSC Server derives a home network domain name. The home network domain is used to perform DNS queries to locate the I-CSCF in the home network;

Step 806: 6. Construct Instance ID: The MSC Server creates an Instance ID derived from the IMEI of UE A as described in this invention;

Step 807: 7. REGISTER request (MSC Server to I-CSCF): (using a message header 900 as seen in FIG. 9). The purpose of this request is to register a private user identity and a temporary public user identity derived for this subscriber on behalf of the user with a S-CSCF in the home network. This request is routed to the I-CSCF in the home network;

Step 808: 8. Cx: User registration status query procedure: The I-CSCF makes a request for information related to the Subscriber registration status by sending the private user identity, public user identity and visited domain name to the HSS. The HSS returns the S-CSCF required capabilities and the I-CSCF uses this information to select a suitable S-CSCF;

Step 809: 9. REGISTER request (I-CSCF to S-CSCF): I-CSCF forwards the REGISTER request to the selected S-CSCF;

Step 810: 10. Cx: S-CSCF Registration Notification: The S-CSCF informs the HSS that the user has been registered. Upon being requested by the S-CSCF, the HSS will also include the user profile in the response sent to the S-CSCF;

Step 811: 11. Construct GRUU: The S-CSCF, acting as the registrar, constructs a GRUU based on the Instance ID that was created in Step 806. The GRUU is constructed as defined in draft-ieff-sip-gruu. Because this Instance ID used was the same that the device would have generated, the GRUU that is created will also be identical to one that would be returned to a device registering directly;

Step 812: 12. 200 (OK) (S-CSCF to I-CSCF): The S-CSCF sends a 200 (OK) response to the I-CSCF indicating that Registration was successful. The 200 (OK) response includes the GRUU that was created in the previous step; and Step 813: 13. 200 (OK) (I-CSCF to MSC Server): The I-CSCF forwards the 200 (OK) response to the MSC Server indicating that Registration was successful. GRUU creation by the registrar (S-CSCF) when the DevID is not protected during registration Optimally, the DevID would be protected even during registration, however there may be circumstances where the DevID is sent in the clear as the Instance ID during registration. In order to provide some level of privacy protection for the user it is necessary to define procedures in the network for constructing the GRUU based on this Instance ID in a way that does not reveal the DevID.

This additional embodiment of the present invention uses the same techniques that were described above for the creation of an Instance ID which protected the DevID. However, in this scenario the registrar (S-CSCF) will apply those techniques to the creation of the GRUU instead of the Instance ID. DevID Format when Transported in the Clear in an Instance ID As specified in a draft-ietf-sip-outbound, any Instance ID must use a URN scheme. Hereinabove is described how an RFC 4122 based URN can be used when sending a protected DevID as the Instance ID. However, when sending a DevID format in the clear, there is currently no finalized RFC to refer. Therefore it is only possible to give examples of what a URN for the DevID might look like. The final format of such a URN may not be identical to the examples presented herein, however the principles described should still apply to other formats that carry the same information.

One potential format for an IMEI based DevID is described in draft-montemurro-gsma-imei-urn. Here is an example Instance ID based on that draft:

3GPP IMEI:

TAC: 35196500

SNR: 718917

Check Digit: 7

+sip.instance="<urn:gsma:imei:35196500-718917-0>"

The zero (0) at the end represents the spare digit which is always transmitted as zero (0).

The registrar uses the received URN format in the Instance ID (+sip.instance) to determine what handling to apply. In this example, receipt of the urn:gsma:imei would be a trigger to apply the procedures outlined in the present invention.

Steps for GRUU Creation by the Registrar (S-CSCF) when the DevID is not Protected during Registration Steps for creation of the GRUU by the registrar (S-CSCF) based on an unprotected DevID in the Instance ID:

Prerequisite: The REGISTER message has arrived at the S-CSCF and the S-CSCF has identified that the Instance ID contains a DevID sent in the clear based on the URN scheme used in the Instance ID. (In the provided example that would be "urn:gsma:imei".) Choose a hash algorithm (MD5 or SHA-1). In this example, MD5 is used. The network and the device must use the same hash algorithm.

Extract the TAC and SNR from the IMEI. The IMEI structure in the URN is shown in the example above. The TAC and SNR are used and the spare digit is omitted for a total of 14 digits used. By omitting the spare digit, this technique is also applicable to the IMEISV where the SVN is omitted.

Place the name space ID (see name space ID defined in Table 2), TAC and SNR in network byte order.

Concatenate the name space ID, TAC and SNR

Compute the hash of the concatenated string using the preselected hash algorithm.

Set the UUID fields as specified in RFC 4122, subclause 4.3 using the hash as computed above and create the string representation as show in clause 3 of the specified RFC.

Place the string representation in urn form by prepending "urn:uuid" to the above string. Example: urn:uuid:3647f493-4948-abe2-6599-7c295ab29804

This UUID URN is the GRUU to be assigned based on the received Instance ID.

In the case of non-3GPP devices where an identifier other than IMEI is used, the only criteria is that the contents of the Instance ID be unique to the device and not change over time.

An alternative approach can be used by the registrar in case that it doesn't recognize the URN format or in the case of non-3GPP devices which may not have an IMEI equivalent. In these cases the registrar could use the following steps:

Choose a hash algorithm (MD5 or SHA-1). In this example, MD5 is used. The network and the device must use the same hash algorithm.

Extract the name space specific (NSS) string from the URN (defined in RFC 2141) from the Instance ID (+sip.instance)

Place the NSS in network byte order

Compute the hash of the NSS

This hashed value is the GRUU to be assigned based on the received Instance ID.

Example Call Flows Providing DevID Protection in the Registrar

Basic call flows using embodiments of the present invention are now shown. These example call flows illustrate an IMS-based network architecture, however, the present invention also applies to non-IMS architectures as well.

Figure 10:
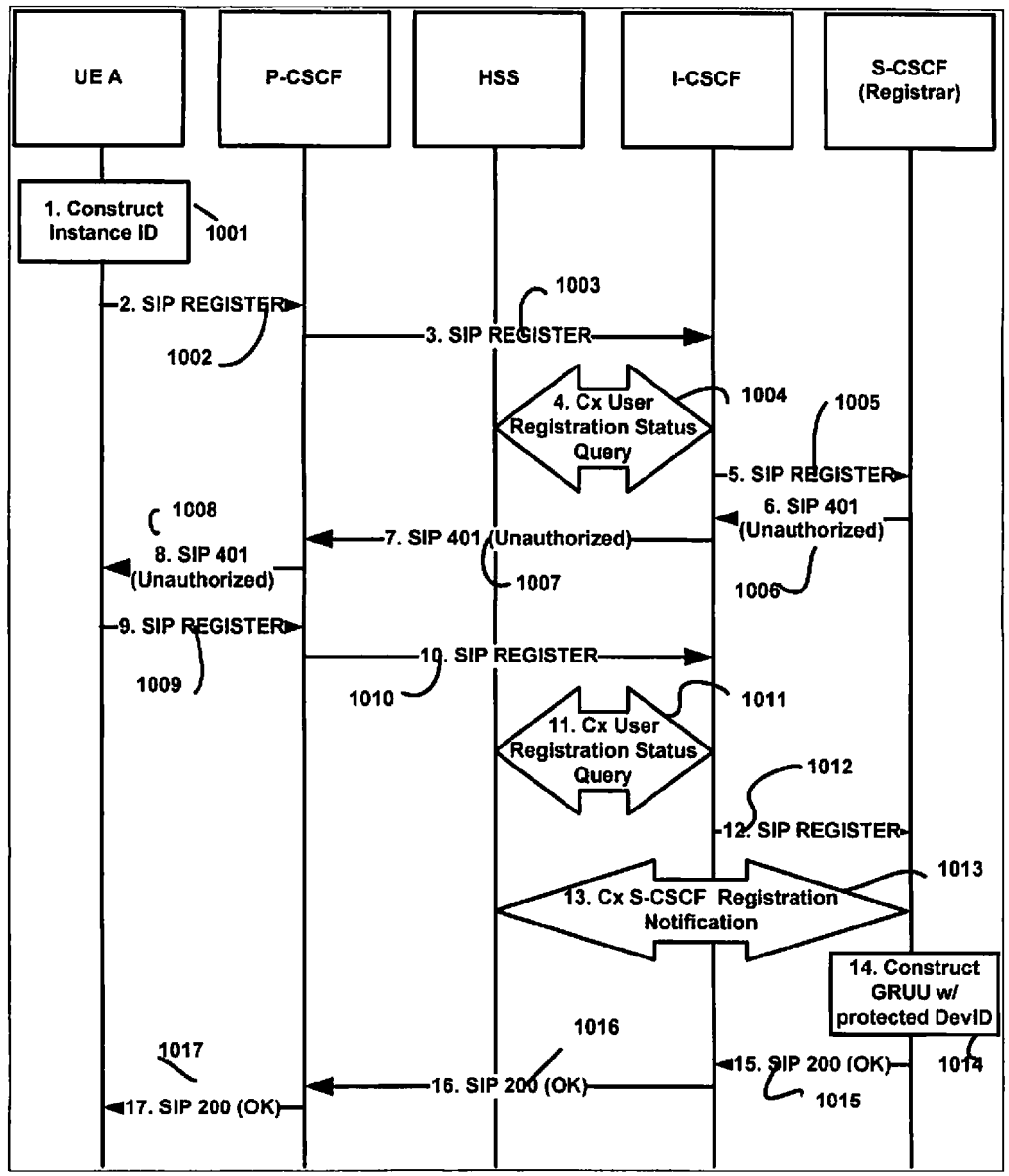
FIG. 10 illustrates device registration with an unprotected DevID in the Instance ID.

FIG. 10 illustrates the steps when the mobile device registers itself directly in IMS, towards the registrar, using PS access. This provides the basic registration flow for a device implementing the present invention. As seen therein, the signaling flows are as follows:

Step 1001: 1. Construct Instance ID: UE A creates an Instance ID using a URN format which transports the IMEI in clear text.

Step 1002: 2. REGISTER request (UE A to P-CSCF): (using a message header 1100 as seen in FIG. 11);

Step 1003: 3. REGISTER request (P-CSCF to I-CSCF): The P-CSCF forwards the request to the I-CSCF.

Step 1004: 4. Cx: User registration status query procedure: The I-CSCF makes a request for information related to the Subscriber registration status by sending the private user identity, public user identity and visited domain name to the HSS. The HSS returns the S-CSCF required capabilities and the I-CSCF uses this information to select a suitable S-CSCF.

Step 1005: 5. REGISTER request (I-CSCF to S-CSCF): I-CSCF forwards the REGISTER request to the selected S-CSCF.

Step 1006: 6. 401 (Unauthorized) (S-CSCF to I-CSCF): The S-CSCF challenges the registration request.

Step 1007: 7. 401 (Unauthorized) (I-CSCF to P-CSCF): The I-CSCF forwards the response to the P-CSCF.

Step 1008: 8. 401 (Unauthorized) (P-CSCF to UE A): The P-CSCF forwards the response to UE A.

Step 1009: 9. REGISTER request (UE A to P-CSCF): UE A resends the REGISTER request (depicted in Step 1002), this time with authentication credentials.

Step 1010: 10. REGISTER request (P-CSCF to I-CSCF): The P-CSCF forwards the request to the I-CSCF.

Step 1011: 11. Cx: User registration status query procedure: The I-CSCF makes a request for information related to the Subscriber registration status by sending the private user identity, public user identity and visited domain name to the HSS. The HSS returns the S-CSCF required capabilities and the I-CSCF uses this information to select a suitable S-CSCF.

Step 1012: 12. REGISTER request (I-CSCF to S-CSCF): I-CSCF forwards the REGISTER request to the selected S-CSCF.

Step 1013: 13. Cx: S-CSCF Registration Notification: The S-CSCF informs the HSS that the user has been registered. Upon being requested by the S-CSCF, the HSS will also include the user profile in the response sent to the S-CSCF.

Step 1014: 14. Construct GRUU: The S-CSCF (acting as the registrar) constructs a GRUU based on the Instance ID that was sent in Step 1001 above. The GRUU shall be constructed as defined by the present invention (see Steps for GRUU creation by the registrar (S-CSCF) when the DevID is not protected during registration).

Step 1015: 15. 200 (OK) (S-CSCF to I-CSCF): The S-CSCF sends a 200 (OK) response to the I-CSCF indicating that Registration was successful. The 200 (OK) response includes the GRUU that was created in the previous step (using a message header 1200 as seen in FIG. 12);

Step 1016: 16. 200 (OK) (I-CSCF to P-CSCF): The I-CSCF forwards the 200 (OK) response to the P-CSCF indicating that Registration was successful.

Step 1017: 17. 200 (OK) (P-CSCF to UE A): The P-CSCF forwards the 200 (OK) response to UE A indicating that Registration was successful.

Figure 13:
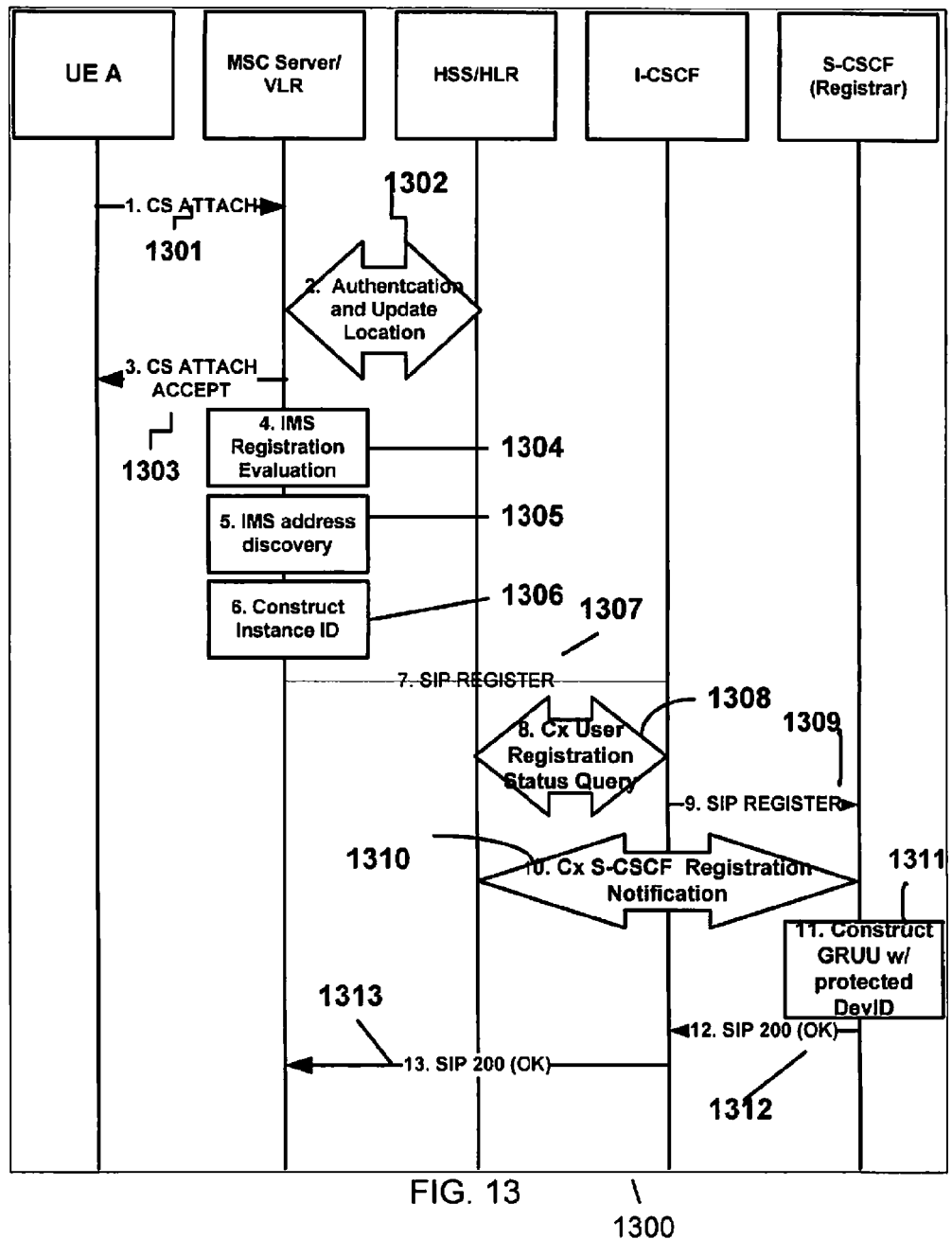
FIG. 13 illustrates the steps of a network registration on behalf of a CS UE with an unprotected DevID in Instance ID.

FIG. 13 illustrates the second flow when the network registers on behalf of a device that is using CS access. This enhances a flow found in 3GPP TS 24.292 by adding the functionality provided by the present invention. The steps of the signaling flows are as follows:

Step 1301 1. CS attach (UE A to MSC)

Step 1302 2. Authentication and Update Location (MSCNLR to HLR/HSS)

Step 1303 3. CS attach accept (MSC to UE A)

Step 1304 4. IMS Registration evaluation: The MSC Server evaluates whether it needs to perform registration with IMS. This can be based on subscriber data received from the HSSIHLR.

Step 1305 5. IMS address discovery: The MSC Server derives a home network domain name. The home network domain is used to perform DNS queries to locate the I-CSCF in the home network.

Step 1306 6. Construct Instance ID: The MSC Server creates an Instance ID using a URN format which transports the IMEI in clear text.

Step 1307 7. REGISTER request (MSC Server to I-CSCF): The purpose of this request is to register a private user identity and a temporary public user identity derived for this subscriber on behalf of the user with a S-CSCF in the home network. This request is routed to the I-CSCF in the home network.

Step 1308 8. Cx: User registration status query procedure: The I-CSCF makes a request for information related to the Subscriber registration status by sending the private user identity, public user identity and visited domain name to the HSS. The HSS returns the S-CSCF required capabilities and the I-CSCF uses this information to select a suitable S-CSCF. (using a message header 1400 as seen in FIG. 14);

Step 1309 9. REGISTER request (I-CSCF to S-CSCF): I-CSCF forwards the REGISTER request to the selected S-CSCF.

Step 1310 10. Cx: S-CSCF Registration Notification: The S-CSCF informs the HSS that the user has been registered. Upon being requested by the S-CSCF, the HSS will also include the user profile in the response sent to the S-CSCF.

Step 1311 11. Construct GRUU: The S-CSCF (acting as the registrar) constructs a GRUU based on the Instance ID that was sent in Step 1306 above. The GRUU shall be constructed as defined by this invention (see Steps for GRUU creation by the registrar (S-CSCF) when the DevID is not protected during registration).

Step 1312 12. 200 (OK) (S-CSCF to I-CSCF): The S-CSCF sends a 200 (OK) response to the I-CSCF indicating that Registration was successful. The 200 (OK) response includes the GRUU that was created in the previous step (using a message header 1500 as seen in FIG. 15);

Step 1313 13. 200 (OK) (I-CSCF to MSC Server): The I-CSCF forwards the 200 (OK) response to the MSC Server indicating that Registration was successful.

Figure 16:
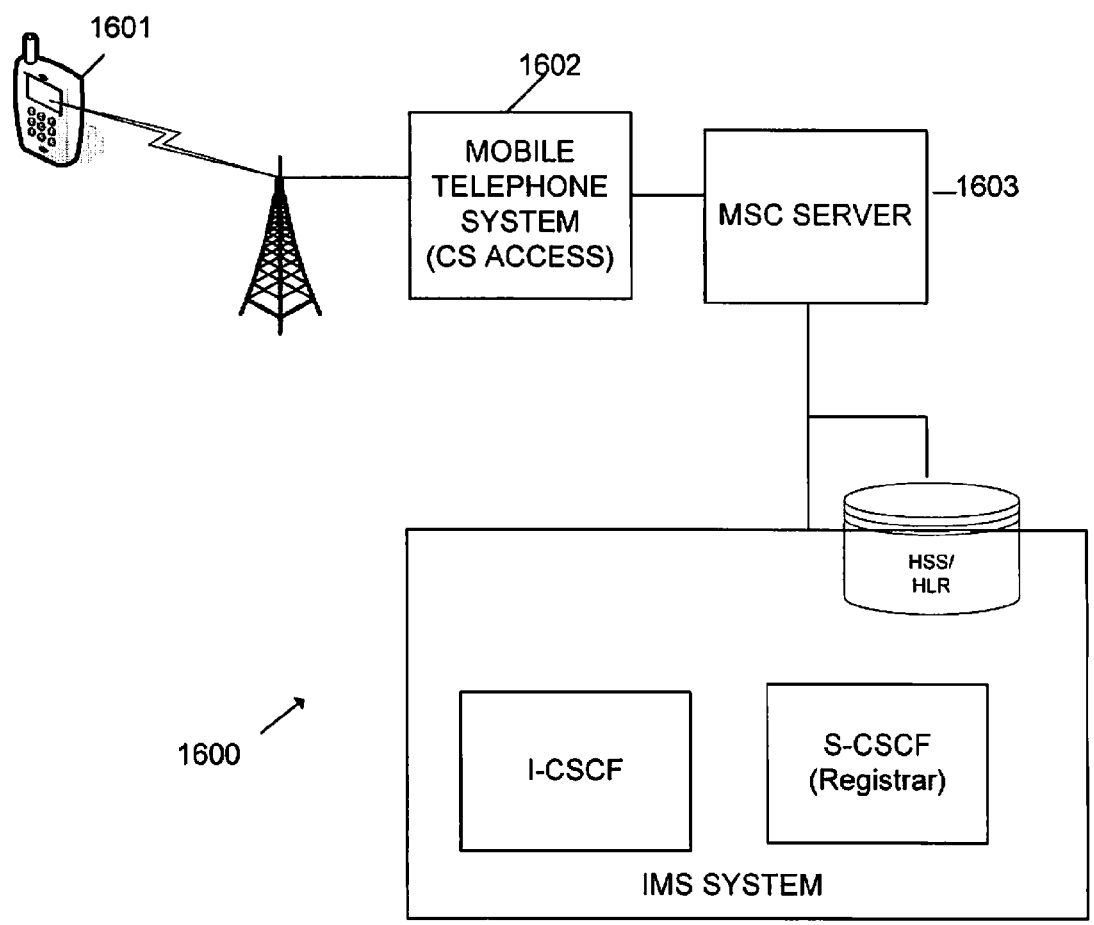
FIG. 16 is a system implementing an embodiment of the present invention when the UE is connected via CS access.

FIG. 16 is a system 1600, implementing an embodiment of the present invention when a UE 1601 is connected via CS access 1602 and the network creates the ID in the MSC server 1603.

Figure 17:
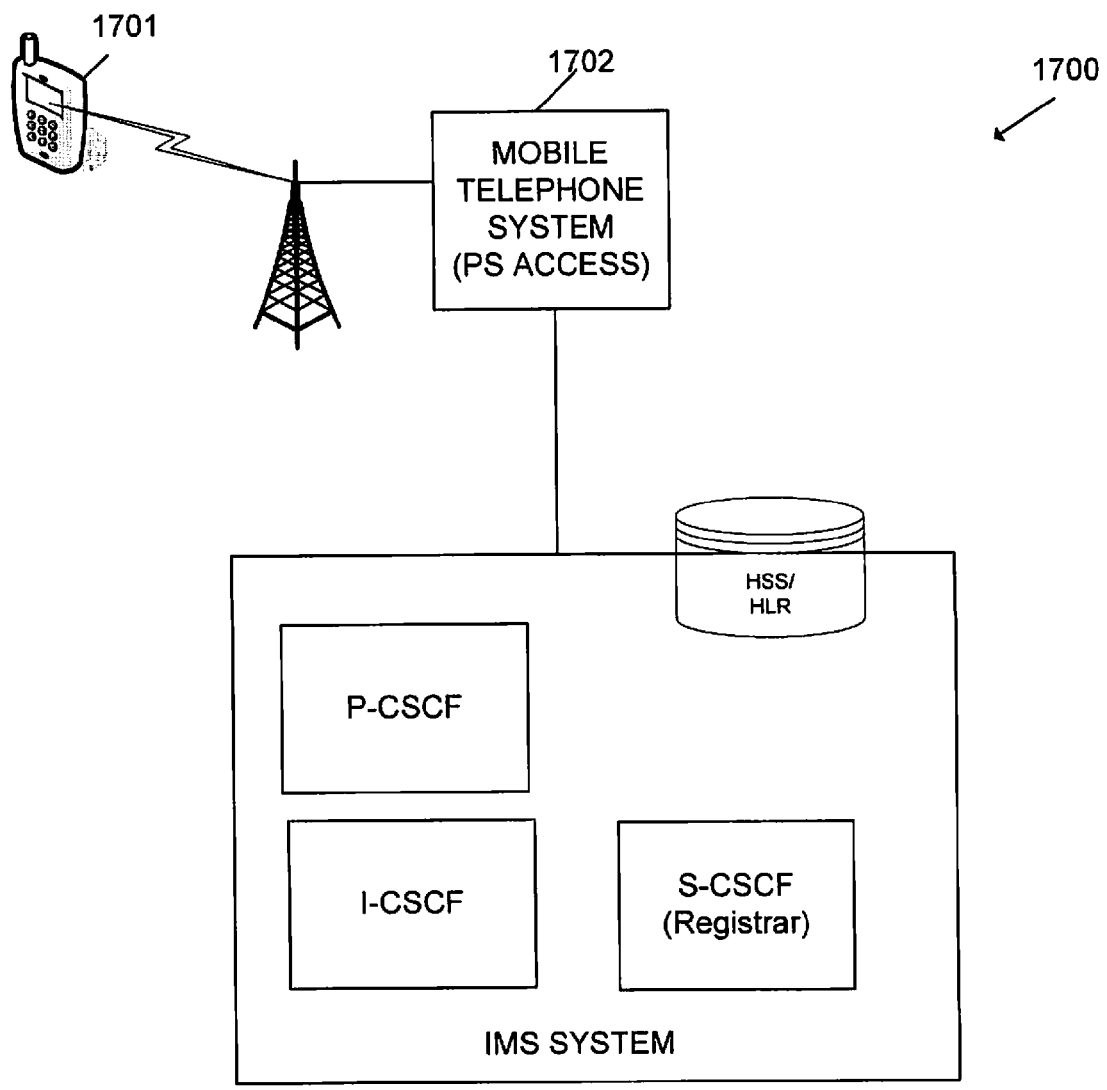
FIG. 17 is a system implementing an embodiment of the present invention when the UE is connected via PS access.

FIG. 17 is a system 1700 implementing an embodiment of the present invention when a UE 1701 is connected via PS access 1702 and the UE 1701 creates the ID in the UE 1701 directly.

Figure 18:
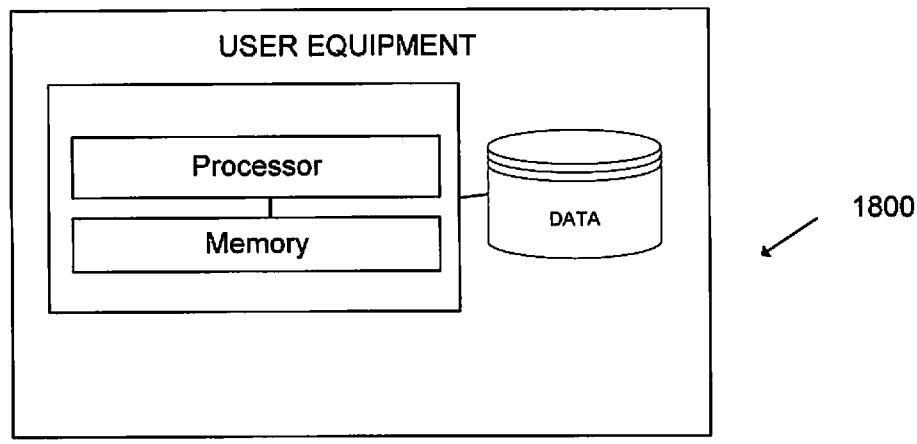
FIG. 18 is a UE for creating an ID, as used in an embodiment of the present invention.

FIG. 18 is a UE 1800 for creating an ID, as used in an embodiment of the present invention. The data used to create the ID can be e.g., the IMEI, MEID, or the Private ID. the UE 1800 would also contain the shared namespace to create the ID.

Figure 19:
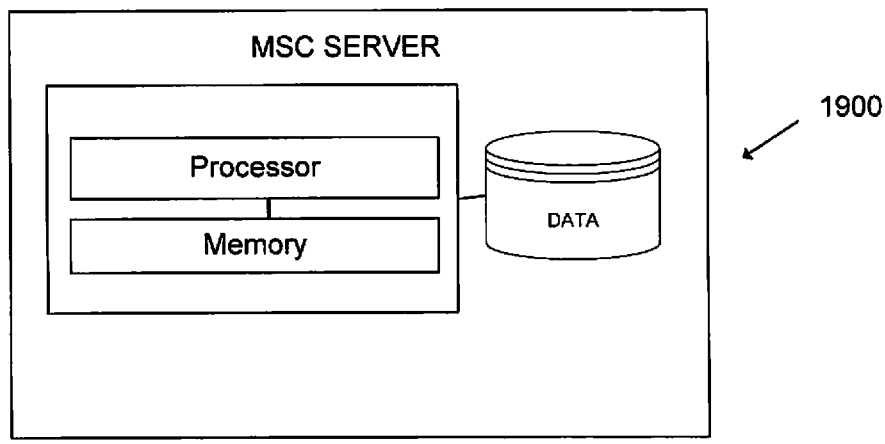
FIG. 19 is an MSC Server for creating an ID, as used in an embodiment of the present invention.

FIG. 19 is an MSC server 1900 for creating an ID, as used in an embodiment of the present invention. The data used to create the ID can be e.g., the IMEI, MEID, or the Private ID. the MSC server 1900 would also contain the shared namespace to create the ID.

The present invention has numerous advantages. It ensures that any Instance ID created by a network will be identical to an Instance ID created by the device. This, in turn, results in the same GRUU being defined regardless of how the device was registered (directly or by the network). The present invention provides specific steps to outline the creation of the Instance ID, particularly in the case of an IMS system. In this manner, it fills a gap in the existing 3GPP specifications. The present invention thus ensures consistent behavior for IMS-based services such as ICS. Further, the use of a hash to derive the Instance ID protects the device specific identifier, such as the IMEI and MEID, which in turn protects the integrity of this device specific identifier, thus enhancing security.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of providing device identification (DevID) protection in a user equipment of network, comprising the steps of:
    constructing, by a User Equipment (UE), an Instance ID derived from an International Mobile Equipment Identity (IMEI);
    performing a REGISTER request from a UE to a Proxy-Call Session Control Function (P-CSCF);
    forwarding, by the P-CSCF, the request to the Interrogating-C II Session Control Function (I-CSCF);
    making, by the I-CSCF, a request for information related to the Subscriber registration status by sending the private user identity, public user identity and visited domain name to an Home Subscriber Server (HSS);
    returning, by the HSS, the Serving-Call Session Control Function (S-CSCF) required capabilities to the I-CSCF;
    using, by the I-CSCF, the S-CSCF required capabilities information to select a suitable S-CSCF;
    forwarding, by the I-CSCF, the REGISTER request to the selected S-CSCF;
    challenging, by the S-CSCF, the registration request;
    forwarding, by the I-CSCF, the response to the P-CSCF;
    forwarding, by the P-CSCF, the response to the UE;
    resending, by the UE, the REGISTER request with authentication credentials;
    forwarding, by the P-CSCF, the request to the I-CSCF;
    making, by the I-CSCF, a request for information related to the Subscriber registration status by sending the private user identity, public user identity and visited domain name to an HSS;
    returning, by the HSS the S-CSCF required capabilities;
    using, by the I-CSCF, the information about the S-CSCF required capabilities to select a suitable S-CSCF;
    forwarding, by the I-CSCF, the REGISTER request to the selected S-CSCF;
    informing, by the S-CSCF, the HSS that the user has been registered;
    including, upon being requested by the S-CSCF, by the HSS the user profile in the response sent to the S-CSCF;
    constructing, by the S-CSCF acting as registrar, a Globally Routable User Agent (GRUU) based on the Instance ID;
    sending, by the S-CSCF sends a 200 (OK) response, including the GRUU, to the 1CSCF indicating that registration was successful;
    forwarding, by the I-CSCF, the 200 (OK) response to the P-CSCF indicating that registration was successful; and
    forwarding, by the P-CSCF, the 200 (OK) response to UE indicating that registration was successful.

2. A method for use by a device, such as a User Equipment (UE), for registering in an IP Multimedia Subsystem (IMS), towards a registrar, using packet switched access, comprising the steps of:
    creating, by the UE, an Instance identification (ID) using a Uniform Resource Name (URN) format which transports a Type Allocation Code (TAC) and Serial Number (SNR) in clear text;
    sending, by the UE, a REGISTER request to a Proxy-Call Session Control Function (P-CSCF);
    forwarding, by the P-CSCF to an Interrogating CSCF (I-CSCF) the REGISTER request;
    making, by the I-CSCF, a request for information related to the Subscriber registration status by sending the private user identity, public user identity and visited domain name to a Home Subscriber Server (HSS) of the UE;
    returning, by the HSS, the required capabilities;
    using, by the I-CSCF, the required capabilities to select a suitable S-CSCF;
    forwarding by the I-CSCF to the selected S-CSCF, the REGISTER request;
    challenging, by the selected S-CSCF, the registration request;
    if unauthorized, forwarding by the selected I-CSCF, the response to the P-CSCF, the P-CSCF forwarding the response to UE, the UE reseeding the REGISTER request to the P-CSCF with authentication credentials and the P-CSCF forwarding the request to the I-CSCF.

3. The method of claim 2, further comprising the steps of performing a user registration status query procedure, comprising:
    the I-CSCF requesting information related to the Subscriber registration status by sending the private user identity, public user identity and visited domain name to the HSS.;
    the HSS returning the S-CSCF required capabilities and the I-CSCF using this information to select a suitable S-CSCF;
    the I-CSCF forwards the REGISTER request to the selected S-CSCF;
    the S-CSCF informing the HSS that the user has been registered; whereupon being requested by the S-CSCF, the HSS will also include the user profile in the response sent to the S-CSCF; further comprising constructing a Globally Routable User Agent (UA) URIs (GRUU) by the S-CSCF, acting as the registrar.

4. The method of claim 3, further comprising the steps of sending, by the SCSCF a 200 (OK) response to the I-CSCF indicating that registration was successful;
forwarding, by the I-CSCF, the 200 (OK) response to the P-CSCF indicating that registration was successful; and
forwarding, by the P-CSCF, the 200 (OK) response to UE indicating that registration was successful.

5. A method for registering, by a network, a device, such as a User Equipment (UE), using circuit switched (CS) access, comprising the steps of:
CS attaching by a UE to a Mobile Switching Center (MSC) Server;
performing, by the MSC/Visitor Location Registrar (VLR) to a Home Location Registrar/Home Subscriber Server (HLR/HSS), authentication and location updating;
CS attach accepting by the MSC to the UE;
evaluating, by the MSC Server, whether it needs to perform registration with the IP Multimedia Subsystem (IMS), comprising the steps of deriving a home network domain name to perform DNS queries to locate the Interrogating-Call Session Control Function (I-CSCF) in the home network;
creating, by the MSC Server, an Instance ID using a URN format which transports an Type Allocation Code (TAG) and Serial Number (SNR) in clear text;
routing a REGISTER request from the MSC Server to the I-CSCF in the home network;
performing a user registration status query procedure;
forwarding the REGISTER request from the I-CSCF to a selected Serving-CSCF (S-CSCF);
informing, by the S-CSCF, of the HSS that the user has been registered;
constructing a Globally Routable User Agent (UA) URIs (GRUU) by the S-CSCF (acting as the registrar) based on the Instance ID;
sending, by the S-CSCF to the I-CSCF, a 200 (OK) response indicating that Registration was successful, the 200 (OK) response including the GRUU; and
forwarding, by the I-CSCF, the 200 (OK) response to the MSC Server indicating that Registration was successful.

* * * * *